United States Patent
Cohen et al.

(10) Patent No.: US 10,249,956 B2
(45) Date of Patent: *Apr. 2, 2019

(54) METHOD AND APPARATUS FOR FOLDED ANTENNA COMPONENTS

(71) Applicant: Fractal Antenna Systems, Inc., Bedford, MA (US)

(72) Inventors: Nathan Cohen, Belmont, MA (US); Philip Salkind, Boston, MA (US)

(73) Assignee: Fractal Antenna Systems, Inc., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/818,086

(22) Filed: Nov. 20, 2017

(65) Prior Publication Data

US 2018/0090845 A1  Mar. 29, 2018

Related U.S. Application Data

(63) Continuation of application No. 14/629,032, filed on Feb. 23, 2015, now Pat. No. 9,825,368.

(60) Provisional application No. 61/966,347, filed on Feb. 22, 2014.

(51) Int. Cl.
| | | |
|---|---|---|
| *H01Q 9/40* | (2006.01) | |
| *B29C 64/00* | (2017.01) | |
| *H01Q 9/28* | (2006.01) | |
| *B33Y 80/00* | (2015.01) | |
| *H01Q 1/00* | (2006.01) | |
| *B33Y 10/00* | (2015.01) | |

(Continued)

(52) U.S. Cl.
CPC .............. *H01Q 9/40* (2013.01); *B29C 64/00* (2017.08); *B33Y 80/00* (2014.12); *H01Q 1/00* (2013.01); *H01Q 9/28* (2013.01); *B29K 2995/0005* (2013.01); *B29L 2009/005* (2013.01); *B29L 2031/3456* (2013.01); *B33Y 10/00* (2014.12)

(58) Field of Classification Search
CPC . H01Q 9/40; H01Q 9/28; B33Y 80/00; B33Y 10/00; B29C 64/00; B29K 2995/0005; B29L 2009/005; B29L 2031/3456
See application file for complete search history.

(56) References Cited

U.S. PATENT DOCUMENTS

| | | | |
|---|---|---|---|
| 3,987,456 A * | 10/1976 | Gelin | ........................ H01Q 1/38 343/773 |
| 5,355,318 A | 10/1994 | Dionnet et al. | |
| 5,396,249 A | 3/1995 | Yamada | |

(Continued)

OTHER PUBLICATIONS

International Search Report and Written Opinion dated Mar. 18, 2016 in PCT/US2015/061690.

(Continued)

*Primary Examiner* — Dameon E Levi
*Assistant Examiner* — David Lotter
(74) *Attorney, Agent, or Firm* — Cesari and McKenna, LLP

(57) ABSTRACT

Method and apparatus for making antennas and antenna components suitable for wideband transmission and reception are disclosed. Material accretion devices or apparatus such as a 3D printer can be used to form the antennas and antenna components. The antenna and antenna components can include pleated and/or self-similar features.

8 Claims, 5 Drawing Sheets

(51) Int. Cl.
*B29L 9/00* (2006.01)
*B29L 31/34* (2006.01)

(56) References Cited

U.S. PATENT DOCUMENTS

| | | |
|---|---|---|
| 6,104,349 A | 8/2000 | Cohen |
| 6,127,977 A | 10/2000 | Cohen |
| 6,140,975 A | 10/2000 | Cohen |
| 6,445,352 B1 | 9/2002 | Cohen |
| 6,452,553 B1 | 9/2002 | Cohen |
| 6,476,766 B1 | 11/2002 | Cohen |
| 6,720,936 B1 | 4/2004 | Koolish et al. |
| 6,985,122 B2 | 1/2006 | Cohen |
| 7,019,695 B2 | 3/2006 | Cohen |
| 7,126,531 B2 | 10/2006 | Nakaya et al. |
| 7,126,537 B2 | 10/2006 | Cohen |
| 7,145,513 B1 | 12/2006 | Cohen |
| 7,190,318 B2 * | 3/2007 | Cohen ............... H01Q 9/28 343/773 |
| 7,215,290 B2 | 5/2007 | Cohen |
| 7,256,751 B2 | 8/2007 | Cohen |
| 7,345,642 B2 | 3/2008 | Cohen |
| 7,456,799 B1 | 11/2008 | Cohen |
| 7,482,994 B2 | 1/2009 | Wen |
| 7,701,396 B2 | 4/2010 | Cohen |
| 2002/0140615 A1 | 10/2002 | Caries et al. |
| 2004/0021597 A1 | 2/2004 | Dvorak |
| 2005/0068240 A1 | 3/2005 | Cohen et al. |
| 2007/0067058 A1 | 3/2007 | Miyamoto et al. |
| 2007/0126637 A1 | 6/2007 | Habib et al. |
| 2007/0236406 A1 | 10/2007 | Wen et al. |
| 2009/0046028 A1 | 2/2009 | Han et al. |
| 2009/0079649 A1 * | 3/2009 | Steghafner ........ H01Q 13/0275 343/786 |
| 2009/0242826 A1 | 10/2009 | Harada et al. |
| 2010/0291304 A1 | 11/2010 | Becker |
| 2011/0102292 A1 * | 5/2011 | Xiong ............... B29C 45/14811 343/873 |
| 2013/0069843 A1 | 3/2013 | Singh et al. |
| 2013/0082895 A1 | 4/2013 | Shiu et al. |
| 2014/0071000 A1 * | 3/2014 | Tani ....................... H01Q 5/001 343/700 MS |
| 2015/0130665 A1 * | 5/2015 | Lacaze ................ H01Q 9/0407 343/700 MS |
| 2015/0138024 A1 | 5/2015 | Kalistaja et al. |

OTHER PUBLICATIONS

Walker, G.J., et al., "Fractal volume antennas," Electronics Letters, vol. 34, No. 16, pp. 1536-1537, Aug. 6, 1998.

Willis, Bryan Jon, "Compact Form Fitting Small Antennas Using Three Dimensional Rapid Prototyping," A dissertation submitted to the faculty of the University of Utah, May 2012.

Facchine, M. J. et al. "Electromagnetic Scattering from Fractal Spheres" 2002 Digest, IEEE Antennas and Propagation Society International Syposium: Jun. 16-21, 2002, San Antonio, TX, IEEE Operations Center, Piscataway, NJ, vol. 3, Jun. 16, 2002, pp. 106-109.

Taeksoo Ji et al., "Fabrication of three dimensional structures by microstereolithography for electromagnetic absorber applications" Database accession No. 8566700, & Smart Structures and Materials 2005: Smart Electronics, Mems, BioMEMS, and Nanotechnology, vol. 5763, No. 1, pp. 126-132. Proceedings of the SPIE, Database Inspec, The Institution of Electrical Engineers, Stevenage, GB, 2005.

Extended European Search Report dated Jul. 17, 2018 for EP Application 15861914.8, 10 pages.

* cited by examiner

METHOD AND APPARATUS FOR FOLDED ANTENNA COMPONENTS

RELATED APPLICATIONS

This application is a continuation of U.S. patent application Ser. No. 14/629,032, filed Feb. 23, 2015 and entitled "Method and Apparatus for Folded Antenna Components," the entire content of which is incorporated herein by reference (now U.S. Pat. No. 9,825,368), which claims priority to and the benefit of U.S. Provisional Application No. 61/966,347 filed Feb. 22, 2014 and entitled "Method and Apparatus for Folded Antenna Components".

BACKGROUND

Antennas are used to typically radiate and/or receive electromagnetic signals, preferably with antenna gain, directivity, and efficiency. Practical antenna design traditionally involves trade-offs between various parameters, including antenna gain, size, efficiency, and bandwidth.

Antenna design has historically been dominated by Euclidean geometry. In such designs, the closed area of the antenna is directly proportional to the antenna perimeter. For example, if one doubles the length of an Euclidean square (or "quad") antenna, the enclosed area of the antenna quadruples. Classical antenna design has dealt with planes, circles, triangles, squares, ellipses, rectangles, hemispheres, paraboloids, and the like.

With respect to antennas, prior art design philosophy has been to pick a Euclidean geometric construction, e.g., a quad, and to explore its radiation characteristics, especially with emphasis on frequency resonance and power patterns. Unfortunately antenna design has concentrated on the ease of antenna construction, rather than on the underlying electromagnetics, which can cause a reduction in antenna performance.

Practical antenna design traditionally involves trade-offs between various parameters, including antenna gain, size, efficiency, and bandwidth. Antenna size is also traded off during antenna design that typically reduces frequency bandwidth. Being held to particular size constraints, the bandwidth performance for antenna designs such as discone and bicone antennas is sacrificed resulted in reduced bandwidth.

Dipole-like antenna have used a bicone or discone shape to afford the performance desired over a large pass band. For example, some pass bands desired exceed 3:1 as a ratio of lowest to highest frequencies of operation, and typically ratios of 20:1 to 100:1 are desired. Some prior art discone antennas have included a sub-element shaped as a cone whose apex is attached to one side of a feed system at location. A second sub-element can be attached to the other side of the feed system, such as the braid of a coaxial feed system. This sub-element is a flat disk meant to act as a counterpoise.

Both discone and bicone antennas afford wideband performance often over a large ratio of frequencies of operation; in some arrangements more than 10:1. However, such antennas are often ¼ wavelength across, as provided by the longest operational wavelength of use, or the lowest operating frequency. In height, the discone is typically ¼ wavelength and the bicone almost ½ wavelength of the longest operational wavelength. Typically, when the lowest operational frequency corresponds to a relatively long wavelength, the size and form factor of these antenna becomes cumbersome and often prohibitive for many applications.

Antenna systems that incorporate a Euclidean geometry include roof-mounted antennas that extend from objects such as residential homes or automobiles. Such extendable antennas can be susceptible to wind and other weather conditions and may be limited in bandwidth and frequency range. Additionally, by implementing a Euclidean geometry into these conformal antennas, antenna performance is degraded.

SUMMARY

In accordance with an aspect of the disclosure, an antenna apparatus suitable for wideband transmission and reception. The antenna apparatus can include a bicone antenna portion (bicone antenna) including two cone-shaped elements (e.g., an accordioned bicone antenna) or a reverse bi-cone antenna, have a general shape where the two open ends of the cones are joined (directly or via an intermediate shape). The physical shape of at least one of the two cone-shaped elements may be at least partially defined by one or more pleats (e.g., a series) that extend about a portion of the cone. Other shapes and configurations such as those including self-similar features can be included for the antennas.

A novel system for producing such antenna parts and antennas made by same, is also disclosed. The system uses a three dimensional printer to make volumetric plastic components that incorporate one or more folds and/or have self similar structure (fractal in finite iterations for at least a portion) for at least part of the component. The component may be constructed out of conductive plastic, or non conductive plastic.

If non conductive plastic is used, the component may be plated or gilded with a conductor (such as conductive paint) after printing so the component then conducts and can act as an antenna components. These components may be actual radiators, filters, counterpoises ground planes, or loads. Dipoles, monopoles, dielectric resonators, leaky antennas, metamaterial antennas, metasurface antennas, slot antennas, cavity antennas, and many other kinds of antennas may be made in this system. The antennas may have smaller size and or better gain and or greater bandwidths than antennas of conventional design. They may be used from 50-6000 MHz or any fraction of same bandwidth. They may be used in telematics; wireless, cell phone communication, WIFI, Wimax, UWB, and other systems.

Additional advantages and aspects of the present disclosure will become readily apparent to those skilled in the art from the following detailed description, wherein embodiments of the present invention are shown and described, simply by way of illustration of the best mode contemplated for practicing the present invention. As will be described, the present disclosure is capable of other and different embodiments, and its several details are susceptible of modification in various obvious respects, all without departing from the spirit of the present disclosure. Accordingly, the drawings and description are to be regarded as illustrative in nature, and not as limitative.

BRIEF DESCRIPTION OF THE DRAWINGS

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

Figure 1:
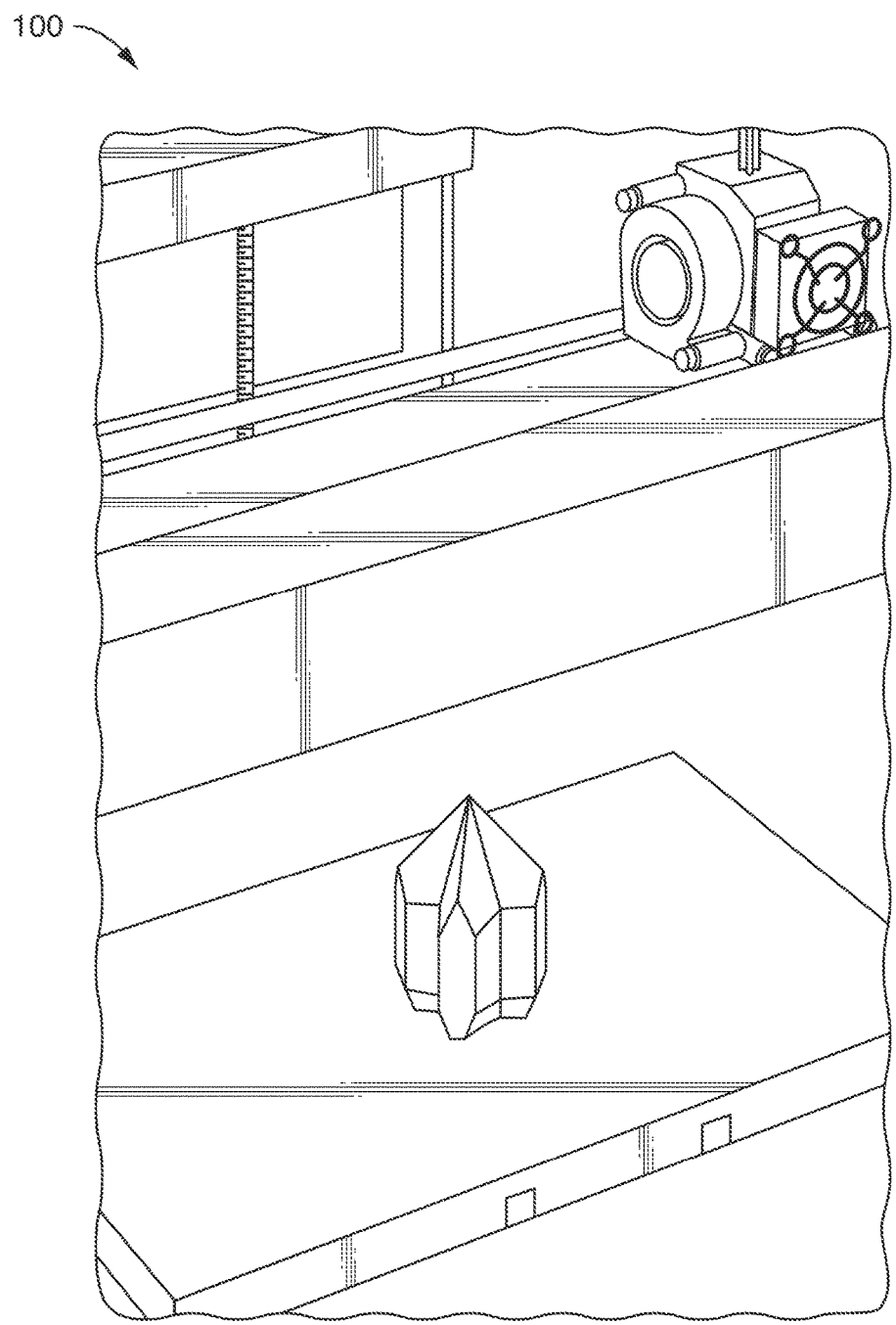
FIG. 1 depicts an antenna component after being printed by a 3D printer, in accordance with an embodiment of the present disclosure.

While certain embodiments are shown in the drawings, one skilled in the art will appreciate that the embodiments depicted in the drawings are illustrative and that variations of those shown, as well as other embodiments described herein, may be envisioned and practiced within the scope of the present disclosure.

DETAILED DESCRIPTION

Embodiments of the present disclosure are directed to wideband antennas and related systems and techniques. Such antennas can include an accordioned bicone antenna, e.g., for frequencies from VHF to microwave, and a fractalized dipole, e.g., for lower frequencies. In exemplary embodiments, the fractalized dipole can include a circuit board with a trace at least a portion of which is self similar for at least two iterations. The circuit board can be conformal inside of a tube or mast structure, which can be a cylinder, and/or may be applied to or supported by the outside surface of the mast. The tube structure can act as a mast for the accordioned bicone, which can be located at the top. Exemplary embodiments can provide operation across a 100:1 passband or greater, e.g., from HF (or MF) frequencies through microwave.

A novel system is described and claimed herein for producing antenna parts and antennas made by same. The system uses a three dimensional printer to make volumetric plastic components that incorporate one or more folds and/or have self-similar structure (fractal in finite iterations for at least a portion) for at least part of the component. The component may be constructed out of conductive plastic, or non-conductive plastic.

If non-conductive plastic is used, the component may be plated or gilded with a conductor (such as conductive paint) after printing so the component then conducts and can act as an antenna components. These components may be actual radiators, filters, counterpoises ground planes, or loads. Dipoles, monopoles, dielectric resonators, leaky antennas, metamaterial antennas, metasurface antennas, slot antennas, cavity antennas, and many other kinds of antennas may be made in this system. The antennas may have smaller size and or better gain and or greater bandwidths than antennas of conventional design. They may be used from 50-6000 MHz or any fraction of same bandwidth. They may be used in telematics; wireless, cell phone communication, WIFI, Wimax, UWB, and other systems.

FIG. 1 shows an antenna component 100 after being made by a material accreting (or accretion) device, e.g., a three-dimensional (3D) printer. An example of a suitable 3D printer is a MakerBot Replicator Z18 3D printer made available by the MakerBot Industries LLC.

Figure 2:
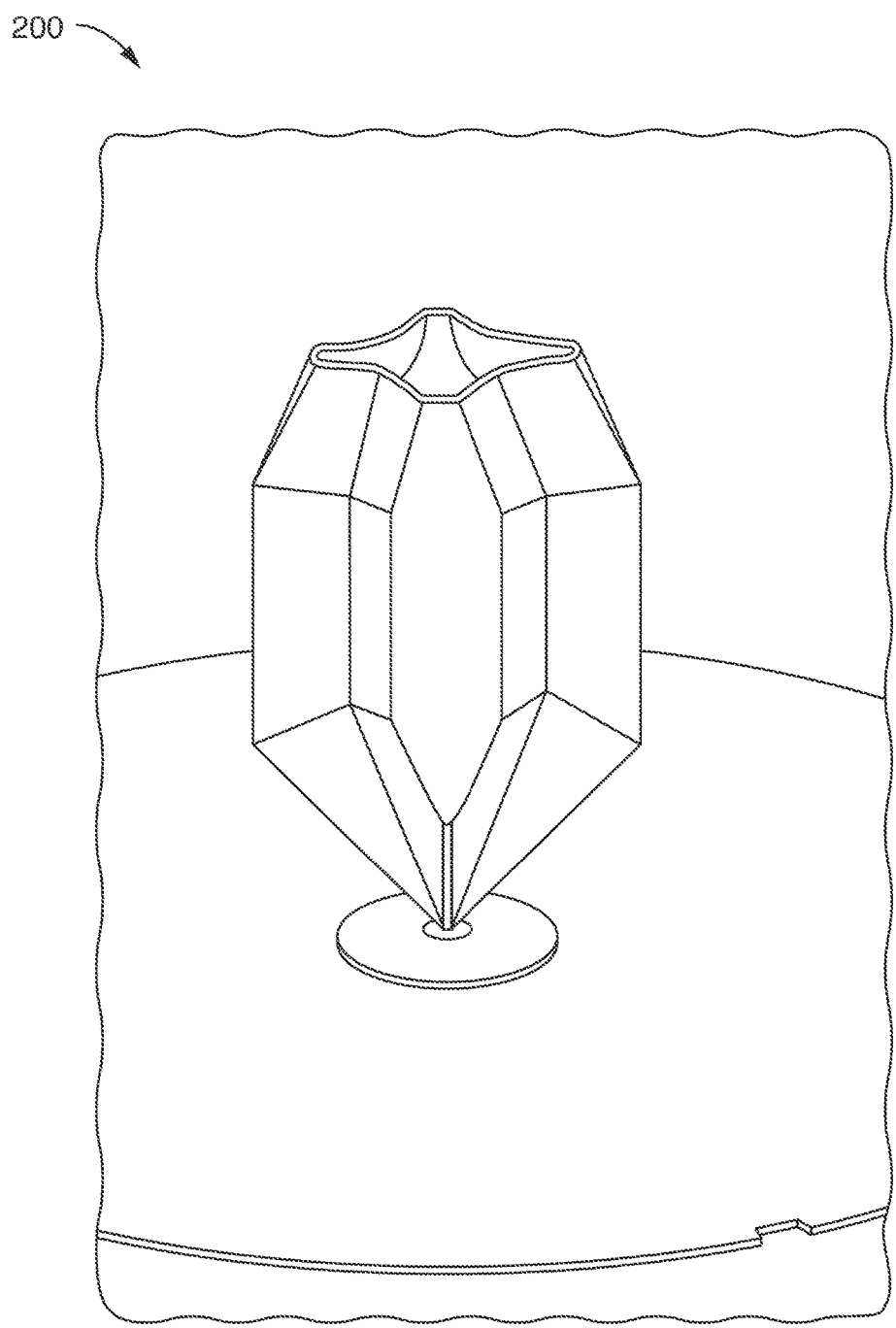
FIG. 2 shows the antenna component of FIG. 1 painted with conductive paint and made into a monopole antenna element.

FIG. 2 shows the antenna component 100 of FIG. 1 painted with conductive paint and made into a monopole antenna element.

Examples of suitable fractal shapes for use in one or more antenna systems and antenna components according to the present disclosure include, but are not limited to, fractal shapes described in one or more of the following patents, owned by the assignee of the present disclosure, the entire contents of all of which are incorporated herein by reference: U.S. Pat. No. 6,452,553; U.S. Pat. No. 6,104,349; U.S. Pat. No. 6,140,975; U.S. Pat. No. 7,145,513; U.S. Pat. No. 7,256,751; U.S. Pat. No. 6,127,977; U.S. Pat. No. 6,476,766; U.S. Pat. No. 7,019,695; U.S. Pat. No. 7,215,290; U.S. Pat. No. 6,445,352; U.S. Pat. No. 7,126,537; U.S. Pat. No. 7,190,318; U.S. Pat. No. 6,985,122; U.S. Pat. No. 7,345,642; and, U.S. Pat. No. 7,456,799. Further examples are disclosed in U.S. application Ser. No. 11/716,909 filed Mar. 12, 2007; U.S. application Ser. No. 10/812,276, filed Mar. 29, 2004; U.S. Provisional Application No. 60/458,333, filed Mar. 29, 2003; U.S. Provisional Application No. 60/802,498 filed 22 May 2006; U.S. application Ser. No. 10/868,858, filed Jun. 17, 2004, now issued as U.S. Pat. No. 7,126,531; and U.S. application Ser. No. 09/700,005, filed Nov. 7, 2000, now issued as U.S. Pat. No. 6,445,352; the contents of all of which applications and patents are incorporated herein by reference in their entireties.

Other suitable fractal shape for antenna systems and antenna components (e.g., a resonator or resonant structures) can include any of the following: a Koch fractal, a Minkowski fractal, a Cantor fractal, a torn square fractal, a Mandelbrot, a Caley tree fractal, a monkey's swing fractal, a Sierpinski gasket, and a Julia fractal, a contour set fractal, a Sierpinski triangle fractal, a Menger sponge fractal, a dragon curve fractal, a space-filling curve fractal, a Koch curve fractal, a Lypanov fractal, and a Kleinian group fractal.

Other features produced by or for embodiments of the present disclosure can include metamaterials, which are materials with negative permittivity and permeability leading to negative index of refraction were theorized by Russian noted physicist Victor Veselago in his seminal paper in *Soviet Physics* USPEKHI, 10, 509 (1968). Since that time, metamaterials have been developed that produce negative index of refraction, subject to various constraints. Such materials are artificially engineered micro/nanostructures that, at given frequencies, show negative permeability and permittivity. Metamaterials have been shown to produce narrow band, e.g., typically less than 5%, response such as bent-back lensing. Such metamaterials produce such a negative-index effect by utilizing a closely-spaced periodic lattice of resonators, such as split-ring resonators, that all resonate. Previous metamaterials provide a negative index of refraction when a sub-wavelength spacing is used for the resonators.

Such features when used in or for antenna systems and components can provide increased performance relative to antennas and antenna components not employing those fractal features, e.g., improved bandwidth characteristics in terms of 3 dB bandwidth, etc.

Figure 3:
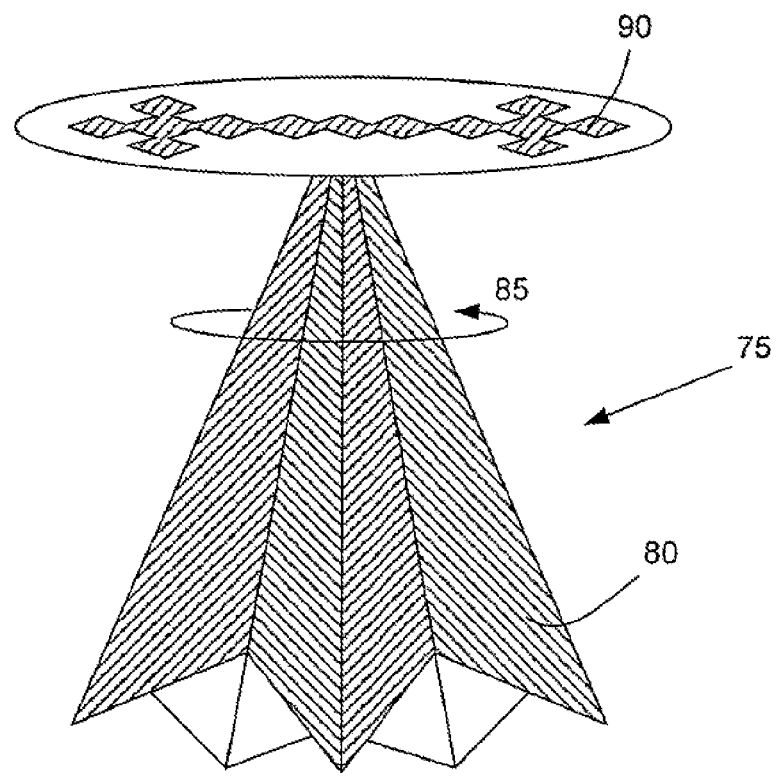
FIG. 3 depicts a discone antenna including a pleated cone and a disk according to an embodiment of the present disclosure.

FIG. 3 depicts a discone antenna 75 including a pleated cone (or, horn) and a disk. Antenna 75 is another example of an antenna component that can be made in accordance with the present disclosure. Referring to FIG. 3, to provide wider bandwidth performance, while allowing for reduced size and form factors, shaping techniques are incorporated into the components of the antenna. For example, a discone antenna 75 includes a conical portion 80 that includes pleats that extend about a circumference 85 of the conical portion. Along with incorporating pleats into the conical portion of the discone antenna 75, to further improve bandwidth performance while allowing for relative size reductions based on operating frequencies, shaping techniques are incorporation into the disc element of the antenna. In this example, a disc element 90 of the discone antenna 75 is defined by a fractal geometry, such as the fractal geometries described in U.S. Pat. No. 6,140,975, filed Nov. 7, 1997, which is herein incorporated by reference. By incorporating the pleats into the conical portion and the fractal (i.e., self-similar) disc design, the size of the discone antenna 74 is approximately one half of the size of the discone antenna 5 (shown in FIG. 1) while providing similar frequency coverage and performance.

Figure 4:
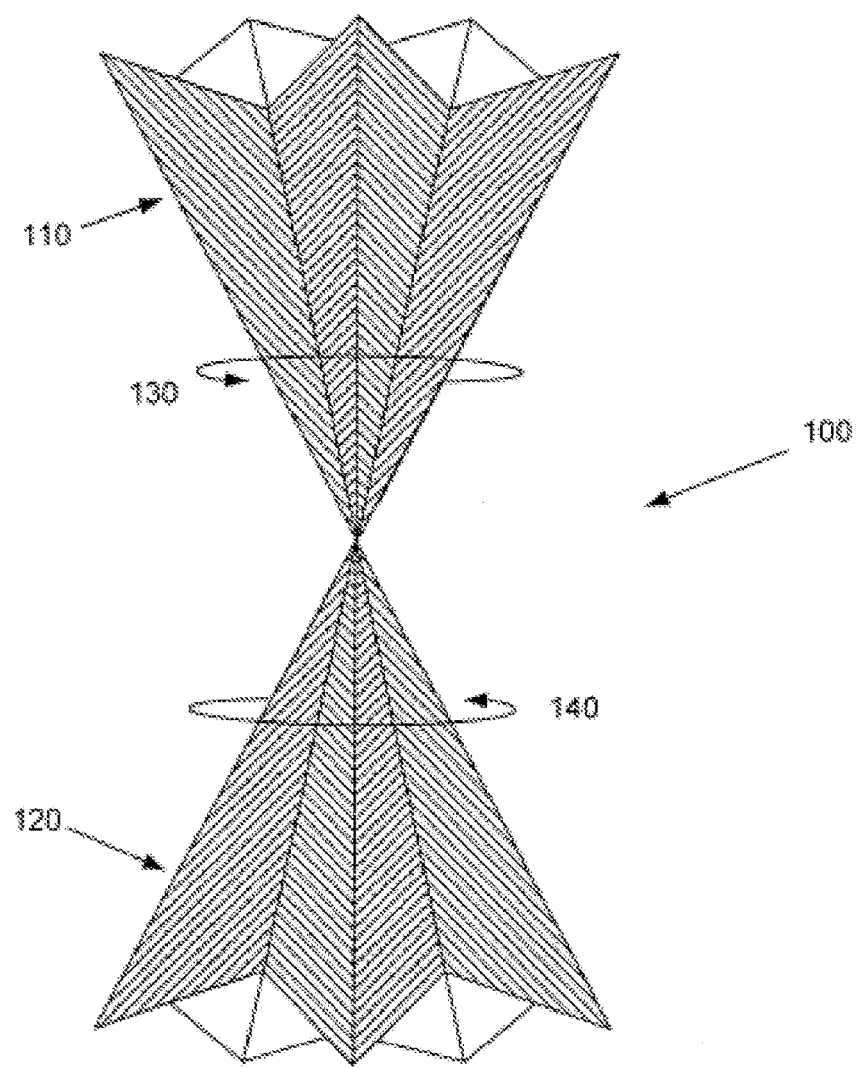
FIG. 4 depicts a bicone antenna with two pleated cones according to an embodiment of the present disclosure.

Referring to FIG. 4, a bicone antenna 100 is shown that includes two conical portions 110, 120. Each of the two conical portions 110, 120 are respectively defined by pleats that extend about the respective circumferences 130, 140 of the two portions. By incorporating the pleat-shaping into the conical portions 110, 120, the bicone antenna 100 provides the frequency and beam-pattern performance of a larger sized bicone antenna that does not include shaping.

While the shaping techniques implemented in the discone antenna 75 (shown in FIG. 3) and the bicone antenna 100 (shown in FIG. 4) utilized a pleat-shape in the conical portions and a fractal shape in the disc portion, other geometric shapes, including one or more holes, can be incorporated into the antenna designs.

By incorporating these shaping techniques, for example, into a discone antenna, such as the discone antenna 75 (shown in FIG. 3), the standing wave ratio (SWR) of the antenna demonstrates the performance improvement. For example, such a structure can exhibit a wideband 50 ohm match of a discone antenna across a preferred frequency band (e.g., 100 MHz-3000 MHz).

Figure 5:
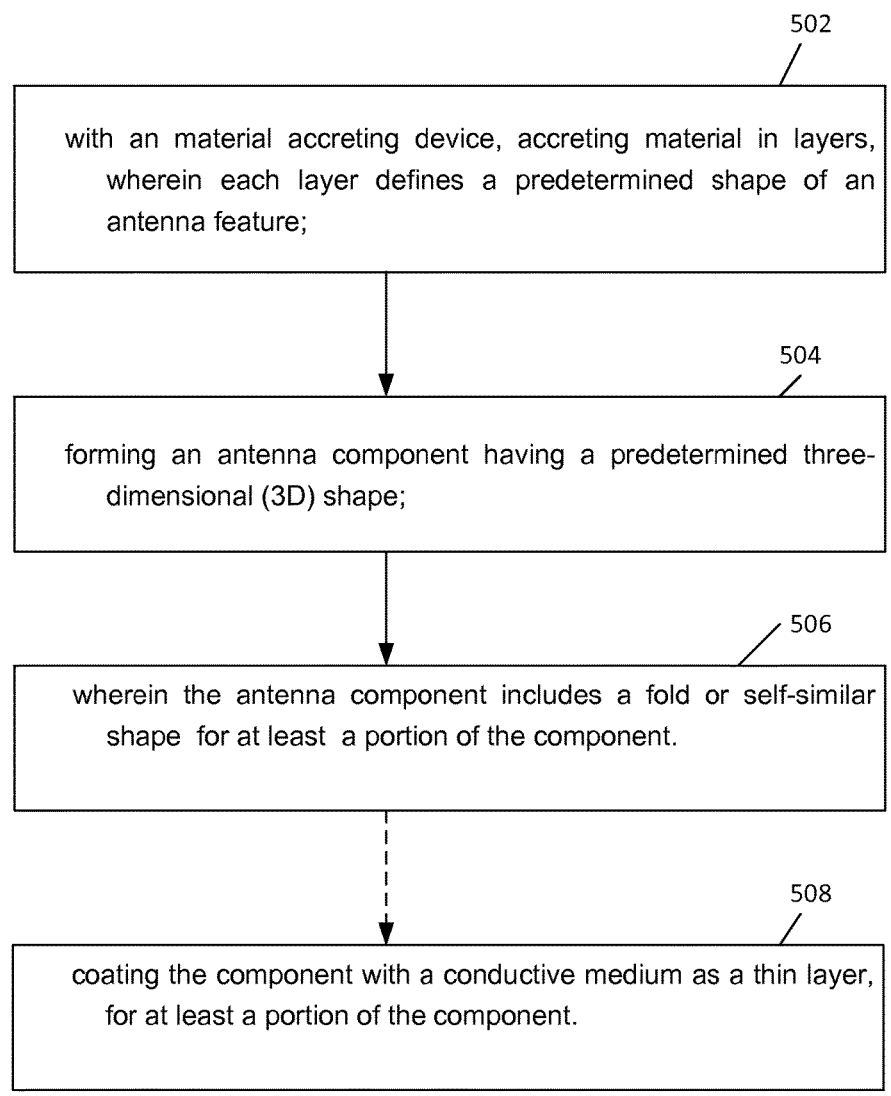
FIG. 5 depicts a method of making an antenna component in accordance with the present disclosure.

FIG. 5 depicts a method 500 of making an antenna component in accordance with the present disclosure. As shown at 502, an material accreting device can be used for accreting material in layers, wherein each layer defines a predetermined shape of an antenna feature. The antenna component can accordingly be formed having a predetermined three-dimensional (3D) shape, as shown at 504. The antenna component includes a pleat or self-similar shape for at least a portion of the component, as shown at 506. As further shown at 508, the method 500 can include coating the component with a conductive medium as a thin layer, for at least a portion of the component.

In some implementations/embodiments, an accordioned bicone antenna apparatus according to an embodiment of the present disclosure can include an accordioned bicone and a fractalized circuit board, which can be conformal to a given surface, e.g., a cylinder. The conformal circuit board can be configured to act as a fractalized dipole. The circuit board can include one or more conductive portions or traces that include self-similar structure such as various suitable fractal shapes. Such an antenna can be fed by a main feed, which may be configured as splitting to (i) a bicone feed leading to the center of the accordioned bicone, and (ii) a dipole feed feeding the fractalized dipole section. RLC matching circuitry may be used in exemplary embodiments.

While the shaping techniques implemented in or for a bicone antenna (or other shape or configuration of antenna such as disclosed in the patents and applications incorporated herein) can utilize a pleat-shape in the conical portions and a fractal shape in/or the conformal portion, other geometric shapes, including one or more holes, can be incorporated into the antenna designs. By incorporating the pleat-shaping into the conical portions, the bicone antenna can provides the frequency and beam-pattern performance of a larger sized bicone antenna that does not include such shaping.

Each pleat, e.g., of a bicone portion, can include two faces joined at a vertex having an included angle of less than 180 degrees as directed away from a principal axis of the cone-shaped element and/or antenna. In exemplary embodiments, the two faces of a pleat do not substantially overlap one another in a direction transverse to a bisector of the included angle. For certain embodiments, the faces and included angle for a pleat can be symmetrical; in other embodiments, the faces and includes angle are not symmetrical (e.g., can lie along the two sides of a non-Isosceles triangle.)

The self-similar shape of the circuit board can be defined as a fractal geometry. In general, fractal geometry may be grouped into random fractals (which can also be referred to as chaotic or Brownian fractals, and include a random noise component) or deterministic fractals. Fractals typically have a statistical self-similarity at all resolutions and are generated by an infinitely recursive process. For example, a so-called Koch fractal may be produced with N iterations (e.g., N=1, N=2, etc.). One or more other types of fractal geometries may also be incorporated into the design to produce antenna. Non-fractal portion(s) (such as sawtooth patterns) can be utilized in conjunction with fractal portion(s). Such patterns can be utilized, e.g., as a counterpoise.

Antenna components can also be made or formed to include metamaterials. Representative frequencies of operation can include, but are not limited to, those over a range of 500 MHz to 1.3 GHz, though others may of course be realized. Operation at other frequencies, including for example those of visible light, infrared, ultraviolet, and as well as microwave EM radiation, e.g., K, Ka, X-bands, etc. may be realized, e.g., by appropriate scaling of dimensions and selection of shape of the resonator elements.

The resonators can be in groups of uniform size and/or configuration (shape) or of several different sizes and/or geometries. The relative spacing and arrangement of groupings (at least one for each specific frequency range) can be defined by self-similarity and origin symmetry, where the "origin" arises at the center of a structure (or part of the structure) individually designed to have the wideband metamaterial property.

By incorporating the fractal geometry into the electrically conductive and non-conductive portions of circuit board, the length and width (e.g., and consequently, electrical size) of the conductive and non-conductive portions of the antenna is increased due to the nature of the fractal pattern. While the lengths and widths increase, however, the overall footprint area of circuit board (fractalized dipole) is relatively small. By providing longer conductive paths, dipole (and, consequently, the related antenna) can perform over a broad frequency band.

In exemplary embodiments, matching circuitry/components can be utilized, e.g., capacitors, RLC circuit(s), etc. Additional tuning can optionally be augmented/facilitated by placement of tuning elements, e.g., capacitors, inductors, and/or RLC circuitry, across the circuit board trace(s), forming a partial electrical trap.

While certain embodiments have been described herein, it will be understood by one skilled in the art that the methods, systems, and apparatus of the present disclosure may be embodied in other specific forms without departing from the spirit thereof. Accordingly, the embodiments described herein are to be considered in all respects as illustrative of the present disclosure and not restrictive.

What is claimed is:

1. A method for producing an antenna component, the method comprising:
with a material accreting device, accreting material in a plurality of layers, wherein each layer defines a separate portion of a predetermined three-dimensional shape of a folded antenna component feature, and wherein a material used for at least one layer is different than a material used for an adjacent layer;
by successive accretions of each of the plurality of layers, combining the plurality of layers, thereby forming a complete folded antenna component having the predetermined three-dimensional shape that is substantially non-planar; and
painting the complete folded antenna component with a conductive paint for at least a portion of the component;
wherein the complete folded antenna component includes a self-similar shape for at least a portion of the component, and wherein one or more of the plurality of layers are painted with the conductive paint and adjacent to layers that are not painted with the conductive paint.

2. The method of claim 1, wherein the complete folded antenna component comprises a horn.

3. The method of claim 1, further comprising incorporating the complete folded antenna component into an antenna.

4. A method for producing an antenna component, the method comprising:
(A) with a material accreting device, accreting material in a plurality of layers, wherein each layer defines a separate portion of a predetermined three-dimensional shape of a folded antenna component feature;
(B) by successive accretions of each of the plurality of layers, combining the plurality of layers, thereby forming a first complete folded antenna component having the predetermined three-dimensional shape that is substantially non-planar;
(C) painting the first complete folded antenna component with a conductive paint for at least a portion of the component; wherein the first complete folded antenna component includes a self-similar shape for at least a portion of the component;
(D) repeating steps (A)-(C) to form a second complete folded antenna component; and
(E) attaching the first complete folded antenna component to the second complete folded antenna component.

5. The method of claim 4, wherein the first complete folded antenna component comprises a horn.

6. The method of claim 4, further comprising incorporating the first and second completed folded antenna components into an antenna.

7. The method of claim 4, wherein the first and second completed folded antenna components have the same shape.

8. The method of claim 4, wherein the first and second completed folded antenna components each have a different shape.

* * * * *